United States Patent [19]

Mayerhöefer et al.

[11] 3,898,307

[45] Aug. 5, 1975

[54] HALOGEN-CONTAINING PHOSPHORIC ACID ESTERS

[75] Inventors: Horst Mayerhöefer, Oberwil, Basel Land; Wolfgang Müeller, Neuallschwil, Basel Land; Urs Sollberger, Fullinsdorf, Basel Land; Rainer Wolf, Allschwil, Basel Land, all of Switzerland

[73] Assignee: Sandoz Ltd., Basel, Switzerland

[22] Filed: Feb. 1, 1974

[21] Appl. No.: 438,700

[30] Foreign Application Priority Data
Feb. 7, 1973   Switzerland.......................... 1773/73

[52] U.S. Cl.............. 260/964; 260/45.7 P; 260/965
[51] Int. Cl................................................ C07f 9/18
[58] Field of Search............................ 260/964, 965

[56] References Cited
UNITED STATES PATENTS
3,706,821   12/1972   Anderson et al. .............. 260/964 X
FOREIGN PATENTS OR APPLICATIONS
1,024,641   3/1966   United Kingdom................. 260/964

*Primary Examiner*—Anton H. Sutto
*Assistant Examiner*—Richard L. Raymond
*Attorney, Agent, or Firm*—Gerald D. Sharkin; Richard E. Vila; Joseph J. Borovian

[57]   ABSTRACT

The invention concerns novel phosphoric acid esters of the formula:

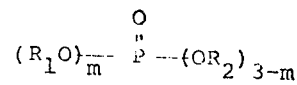

wherein
$R_1$ is a radical

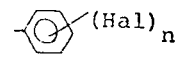

wherein
Hal is chlorine or bromine and
$n$ is an integer 3, 4 or 5,
$R_2$ is a radical $$-CH_2-C(CH_2Hal)_3$$

wherein Hal is as defined above and
$m$ is an integer 1 or 2.

The compounds are useful flame proofing agents, e.g. for the treatment of plastics materials.

8 Claims, No Drawings

HALOGEN-CONTAINING PHOSPHORIC ACID ESTERS

IMPROVEMENTS IN OR RELATING TO ORGANIC COMPOUNDS

The present invention relates to phosphorus containing compounds and more specifically to phosphoric acid esters having flame retarding properties.

The present invention provides compounds of formula I,

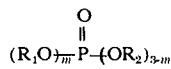    I wherein $R_1$ is a radical

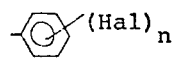

wherein
Hal is chlorine or bromine and
$n$ is an integer 3, 4 or 5,
$R_2$ is a radical $$-CH_2-C(CH_2Hal)_3$$

wherein Hal is as defined above and
$m$ is an integer 1 or 2.

Of the compound of formula I, i.e. the compounds of formula I$a$

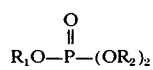    I$a$ wherein $R_1$ and $R_2$ are as defined above,
and the compounds of formula I$b$

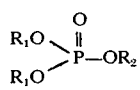    I$b$ wherein $R_1$ and $R_2$ are as defined above,
the compounds of formula I$a$ are of particular interest.

A preferred group of compounds are the compounds of formula I$c$,

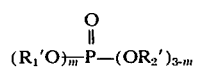    I$c$ wherein
$R_1'$ is a radical

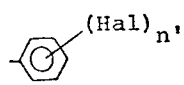

wherein
Hal is as defined above and
$n'$ is an integer 3 or 5,
$R_2'$ is a radical $$-CH_2-C(CH_2Br)_3 \text{ and}$$

$m$ is as defined above.
Preferred significances of $R_1$ are the radicals

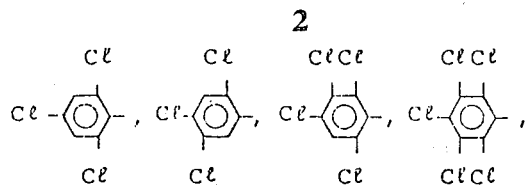

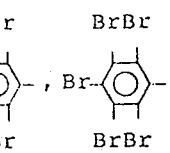

The invention also provides a process for producing a compound of formula I, which comprises condensing a compound of formula II,

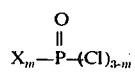    II wherein
X is a radical $R_1O-$ or $R_2O-$ wherein $R_1$ and $R_2$ are as defined above and
$m$ is as defined above,
with a compound of formula III, $$X - H$$    III wherein X is as defined above, preferably in the molar ratio of 1 : (3-m) respectively.

As the reaction results in the cleavage of hydrogen chloride, the reaction is preferably effected in the presence of an acid acceptor. Examples of acid acceptors are tertiary amines, e.g. the tertiary aromatic amine pyridine or alkali carbonate, e.g. sodium or potassium carbonate.

The reaction is suitably effected in an appropriate solvent especially those boiling at between 60° and 110°C, e.g. benzene. The reaction temperature will vary within wide limits. It is preferably initiated at room temperature and concluded at between 50° and 120°C.

The starting materials of formulae II and III are known.

The compounds of formula I possess flame retardant properties and are therefore useful as flame retarding agents. To this end, the compounds of formula I may be employed in a method of flame-proofing flammable organic materials, which comprises treating the organic material with a compound of formula I.

By the term "treating" is meant either surface coating or incorporation into the body of the organic material, in manner known per se.

By the term "flame-proofing", as used herein, is meant a reduction in, and not necessarily complete elimination of, the flammability of the organic material.

The above-mentioned method also forms part of the present invention.

In one embodiment of the method of the invention, the compound is uniformly distributed throughout the organic material by mechanically mixing, e.g. kneading, the compound of formula I with either a particulate, e.g. granulated, form of the organic material or alternatively with a molten form of the organic material. This embodiment is particularly suited to polymer melts, e.g. polyalkylenes and polyesters.

In a further embodiment of the method of the invention, the compound is uniformly distributed throughout a flammable polymeric organic material by incorporation of the compound at the monomer or prepolymer stage of the production of the polymer, and the polymerisation process then effected. This further embodiment is particularly suited to certain polymeric organic materials such as polyurethanes.

After the flammable organic material has been treated in accordance with the method of the present invention, the organic material may, when appropriate, be formed into final shape, such as, by extrusion into, e.g. films, filaments or ribbons, or by moulding, e.g. injection moulding.

The compounds of formula I, in general, possess notable light fastness and high thermostability, the compounds therefore being particularly suitable for incorporation into polymer melts, e.g. for the injection moulding or spinning of polypropylene or polyester at temperatures up to 300°C.

The amount of the compound of formula I with which the organic material is treated in accordance with the method of the invention will, naturally, vary depending on the type of treatment, the compound employed, the nature of the organic material, the degree of flame proofing required and the required properties of the organic material so treated. However, in general, satisfactory results may be achieved when between 2 and 40 percent, preferably between 3 and 10 percent, of the compound is employed in relation to the weight of the organic material.

Examples of flammable organic materials to which the method of the invention is applicable are polyalkylenes, e.g. polyethylene and polypropylene, polyesters, polymethyl methacrylates, polyphenylene oxides, polyurethanes, polystyrene, polyamides, e.g. nylon, polypropylene oxide, polyacrylonitrile and copolymers such as acrylonitrile-butadiene-styrene (ABS) terpolymer, acrylicester-styrene-acrylonitrile terpolymer, styrene-acrylonitrile copolymer and styrene-butadiene copolymer.

One example of the flame-proofing of a flammable organic material will now be described.

METHOD EXAMPLE

A compound of formula I, e.g. the compounds

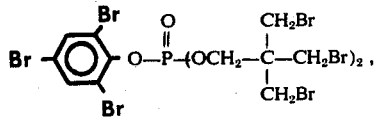

and

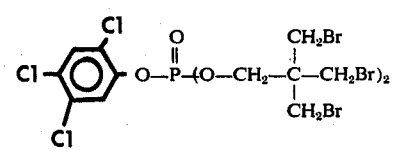

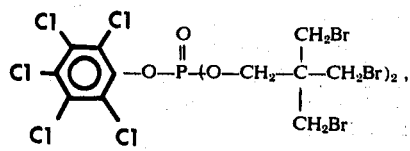

is thoroughly mixed with polypropylene powder, in the ratio of 6 to 9 : 100 parts by weight respectively, the mixture is kneaded on a three-roll mill, and is then drawn off as a hide. The resulting hide is extruded into a sheet of 1 mm thickness.

The degree of flame-proofing may be established by determining the "limiting oxygen index" [Fenimore and Martin, Modern Plastics, Vol. 44 No. 3, page 141 (1966)]. Essentially, the determination comprises supporting a specimen of the sheet vertically in a sealed chamber which is provided with an oxygen/nitrogen gas mixture inlet and also a burner for providing an open flame to which the specimen may be exposed. The oxygen content of the oxygen/nitrogen gas mixture is variable. The proportion of oxygen is varied and the amount at which no further propagation of burning of the sheet after exposure to the open flame is measured and yields the "limiting oxygen index". An index greater than the proportion of oxygen generally present in the atmosphere represents a flame proofing action.

Alternatively, the degree of flame proofing may be determined in accordance with German flammability test DIN 53,438. Essentially, this determination comprises supporting a specimen of the sheet vertically in a chamber and exposing the sheet to a naked flame under controlled conditions, for a period of 15 seconds. After removal of the flame, the period of further burning, and the length of burnt area is determined and compared with an untreated sheet.

The method example was repeated employing a mixture of antimonytrioxide and a compound of formula I, e.g.

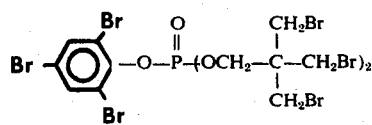

in a ratio by weight of 1 : 2, the resulting mixture being added to polypropylene in the ratio by weight of 6 : 100 respectively and a sheet drawn. The resulting sheet may be tested for flammability as described above.

Examples of the invention will now be described. Where temperatures and percent are referred to, these are °C and by weight respectively.

EXAMPLE 1

45 Parts of phosphoric acid-tribromophenyl-monoesterdichloride and 65 parts of 2,2-bis-bromomethyl-3-bromopropanol are dissolved in 140 parts of absolute tetrahydrofuran. 16 Parts of pyridine are added dropwise at 10°–20°C. The mixture is stirred at room temperature over the course of 2½ hours, whereupon a precipitate settles out. After heating to 50°C, the mixture is stirred for 40 hours. After cooling, the solid substance is filtered off and the filtrate concentrated by evaporation. A viscous oil is obtained to which 200 parts of ether are added with stirring. A white solid is obtained which is recrystallized from acetone. M.P. 116°–118°C. The compound of formula

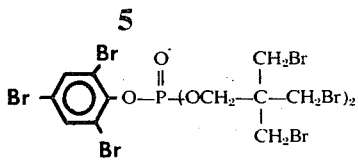

is obtained.

| Analysis: | C | H | Br | P |
|---|---|---|---|---|
| Calc. | 18.7 | 1.8 | 70.2 | 3.0 |
| Found | 19.3 | 2.1 | 69.0 | 3.2 |

The compounds indicated in Table 1 are produced in analogy with the procedure of Example 1.

Table 1

| Exp. | Structure | | Microanalysis | | | | |
|---|---|---|---|---|---|---|---|
| | | | | C | H | P | Br. |
| 2 | 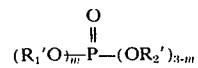 | | Calc. | 19,8 | 1,2 | 3,0 | 69,8 |
| | | | Found | 20,2 | 1,2 | 3,3 | 69,6 |
| 3 | 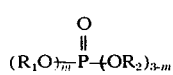 | | Calc. | 21,5 | 2,0 | 3,5 | 53,9 |
| | | | Found | 21,4 | 2,0 | 3,6 | 53,7 |
| 4 | 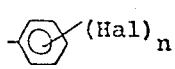 | | Calc. | 20,0 | 1,7 | 3,2 | 50,0 |
| | | | Found | 20,5 | 1,8 | 3,3 | 49,5 |
| | | | Calc. Cl 18,5  Found 18,2 | | | | |

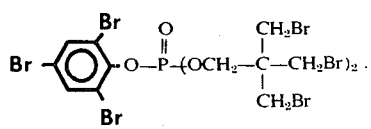

6. The compound of claim 1, of the formula:
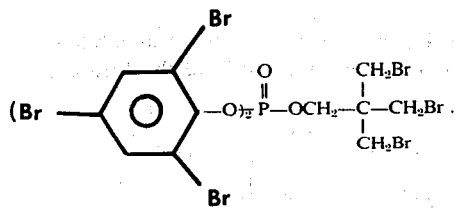
7. The compound of claim 1, of the formula:
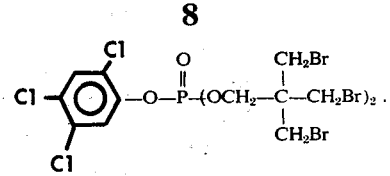
8. The compound of claim 1, of the formula:
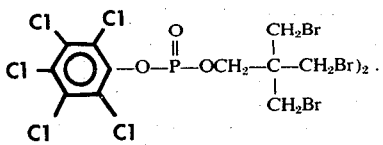

What is claimed is:
1. A compound of the formula:

wherein
$R_1$ is a radical

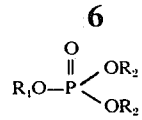

wherein
Hal is chlorine or bromine and
$n$ is an integer 3, 4 or 5,
$R_2$ is a radical $$-CH_2-C(CH_2Hal)_3$$

wherein Hal is as defined above and
$m$ is an integer 1 or 2.

2. A compound of claim 1, of the formula:

$$R_1O-P\begin{matrix}O\\\|\end{matrix}\begin{matrix}OR_2\\OR_2\end{matrix}$$

wherein $R_1$ and $R_2$ are as defined in claim 1.

3. A compound of claim 1, of the formula:

$$\begin{matrix}R_1O\\R_1O\end{matrix}P\begin{matrix}O\\\|\end{matrix}-OR_2$$

wherein $R_1$ and $R_2$ are as defined in claim 1.

4. A compound of claim 1, of the formula:

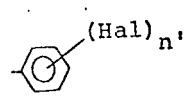

wherein
$R_1'$ is a radical

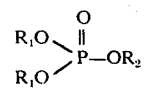

wherein
Hal is as defined in claim 1 and
$n'$ is an integer 3 or 5,
$R_2'$ is a radical $-CH_2-C(CH_2Br)_3$ and
$m$ is an integer 1 or 2.

5. The compound of claim 1, of the formula: